United States Patent [19]

Malabre et al.

[11] Patent Number: 4,850,721
[45] Date of Patent: Jul. 25, 1989

[54] HYDRODYNAMIC BEARING AND METHOD FOR ASSEMBLY OF A BEARING OF THIS TYPE

[75] Inventors: Christian Malabre, La Barthe sur Leze; André Jambou, Castelginest, both of France

[73] Assignee: ABG Semca, Toulouse, France

[21] Appl. No.: 259,911

[22] Filed: Oct. 19, 1988

[30] Foreign Application Priority Data

Oct. 23, 1987 [FR] France .................. 87 14670

[51] Int. Cl.[4] ............................................. F16C 17/02
[52] U.S. Cl. .................................................. 384/106
[58] Field of Search ............... 384/106, 103, 104, 105, 384/100

[56] References Cited

U.S. PATENT DOCUMENTS

| | | | |
|---|---|---|---|
| 4,274,683 | 6/1981 | Gray et al. | 384/106 |
| 4,699,523 | 10/1987 | Hagemeister | 384/106 |
| 4,767,222 | 8/1988 | Patetta | 384/106 |

FOREIGN PATENT DOCUMENTS 95961 12/1983 European Pat. Off. .
2322715 11/1974 Fed. Rep. of Germany .
1028552 5/1966 United Kingdom .

*Primary Examiner*—Lenard A. Footland
*Attorney, Agent, or Firm*—Oblon, Spivak, McClelland, Maier & Neustadt

[57] ABSTRACT

A hydrodynamic bearing to support and guide a rotating machine shaft is disclosed. This bearing comprises, in the bore of a bearing body, an independent cartridge, designed to form the internal functional set of the bearing, said cartridge consisting of thin, curved foils fixed with respect to one another with overlapping parts, so as to make an independent unit having, firstly, an internal floating surface adapted to being placed around the shaft and to conditioning, during the rotation of the shaft, the formation of a fluid film between the shaft and the internal surface and, secondly, a peripheral external surface with a diameter corresponding to that of the bore of the bearing body. It further has means to immobilize the cartridge inside the bore in rotation and in internal translation. Furthermore, the external surface of the cartridge is surrounded with a flexible foil, fixed by one of its ends on an external generatrix of the cartridge, the other end being free.

6 Claims, 4 Drawing Sheets

HYDRODYNAMIC BEARING AND METHOD FOR ASSEMBLY OF A BEARING OF THIS TYPE

BACKGROUND OF THE INVENTION

1. Field of the Invention

The invention concerns a hyrdrodynamic bearing and more especially, a foil bearing. It also concerns a method for the assembly of a bearing of this type.

2. Description of the Prior Art

In rotating machines of high rotating speed, it is most common to use buoyant fluid film bearings preventing any contact between solid surfaces. These bearings are designed to support and guide the shafts of said machines. The most commonly used type of bearing is the hydrodynamic bearing wherein the fluid film is a film generated by the rotation of the shaft or by the shifting of another part. These hydrodynamic bearings therefore have the advantage of being autonomous.

Most of the time, hydrodynamic bearings are foil-bearings. In this case, thin, curved leaves are fixed in the bore of a bearing body so that they partially overlap one another, and form an internal floating surface forming buoyant corners which generate the creation of a fluid film between the foils and the shaft when the rotation speed of the latter reaches a sufficient value.

To simplify the manufacture and maintenance of bearings of this type, the European patent EP-A-No. 095961 has proposed the making of the foils in the form of independent cartridges which are then inserted into the bore of the bearing body. As described in the European patent EP-A-No. 095961, the bearing is made by manufacturing an independent cartridge designed to form the internal functional unit of the bearing, said cartridge consisting of curved thin foils fixed to one another with overlapping parts, so as to form an independent unit possessing, firstly, an internal floating surface adapted to being placed around this shaft and to establishing the conditions, during the rotation of the shaft, for the formation of a fluid film between the shaft and the internal surface and, secondly, a peripheral external surface with a diameter corresponding to that of the bore of the bearing body, in inserting said cartridge thus obtained in the bore of the bearing body, and in holding it still, during rotation and axial translation, with respect to said bearing body. Thus, to enable the insertion of said cartridge in the bore, it becomes therefore necessary to leave a small clearance between these two elements.

Furthermore, according to a preferred embodiment, the independent cartridge is made by fixing the foils to one another by soldering, notably by means of two soldering spots made at the ends of each foil. Now, since the solderings cause the foils to be solidly joined to one another, they cause deformations at each end of the cartridge. Thus, to enable the assembly of the cartridge inside the bore, a certain clearance has to be provided. However, this assembling clearance gets added to the clearance needed for precise operation of the hydrodynamic bearing. This causes an excessive total clearance under the effect of pressure exerted on the entire central part of the bearing.

An object of the present invention, therefore, is to overcome this disadvantage by providing a precise operating clearance throughout the length of the bearing.

SUMMARY OF THE INVENTION

Consequently, an object of the present invention is a hydrodynamic bearing of the type described in the European patent EP-A-No. 095961, wherein the external surface of the cartridge is surrounded by a flexible foil fixed by one of its ends on an external generatrix of the cartridge while its other end is free.

The use of a flexible foil surrounding the external surface of the cartridge thus increases the stiffness of the cartridge and makes it possible to overcome, at least partially, the deformations that appear at each end of the cartridge because of the solderings.

According to a preferred embodiment, the flexible foil consists of a steel foil. This flexible foil is preferably rectangular, and the length between the fixed end on the generatrix and the free end is smaller than the circumference of the cartridge so as to leave a clearance of a few millimeters during assembly. Furthermore, the size of the end of the fixed flexible foil on the generatrix of the cartridge is smaller than the length of this cartridge. The flexible foil is also fixed to the cartridge by soldering, the two soldering spots being made on the fixing edges of the cartridge located at its ends.

In fact, the unit comprising the cartridge surrounded by the flexible foil has a diameter greater than the diameter of the bore of the bearing body designed to take this set. Thus, this unit is assembled by placing the body of the bearing in a heated chamber, inserting the cartridge provided with the flexible foil in the bore of the bearing body and holding it still, in rotation and axial translation with respect to this bearing body, and in then letting the entire unit cool down. The chamber is preferably heated to a temperature greater than or equal to 200° C. Consequently, the bearing body is expanded, thus enabling the unit formed by the cartridge and the flexible foil to be inserted without effort in the bore of the bearing body. For the body of the bearing is generally made of a light alloy which exhibits an expansion of more than 0.2 millimeters at a temperature of 200° C. During cooling, the unit consisting of the cartridge and the flexible foil is thus clamped in the bearing body without any assembling clearance.

BRIEF DESCRIPTION OF THE DRAWINGS

Other features and advantages of the present invention will emerge from the following description of an embodiment made with reference to the appended drawings, of which.

To simplify the description, the same references are repeated for the same elements in the figures.

DESCRIPTION OF A PREFERRED EMBODIMENT

Figure 1:
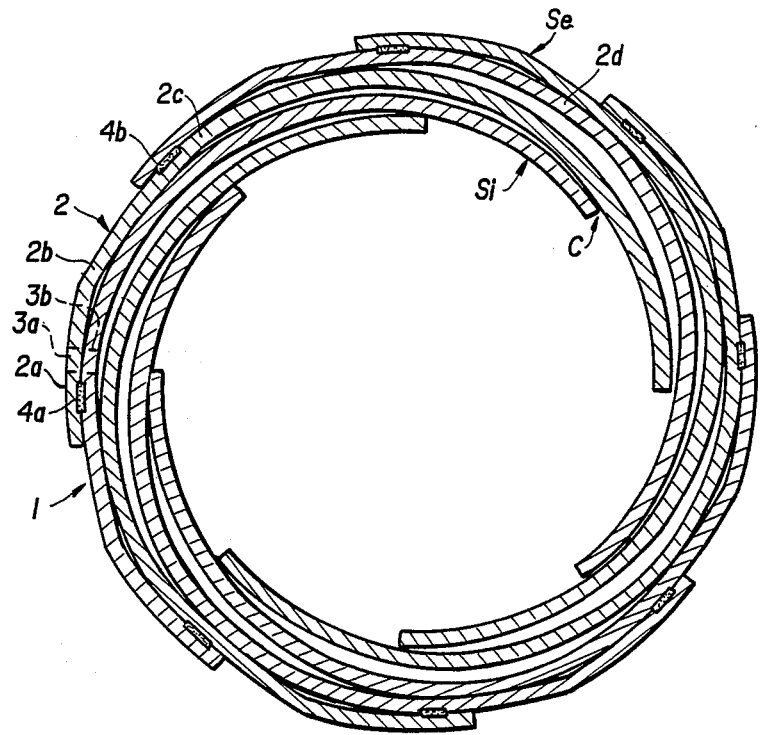
FIG. 1 shows a cross-sectional view of an independent cartridge according to the European patent EP-A-No. 095961.
Figure 2:
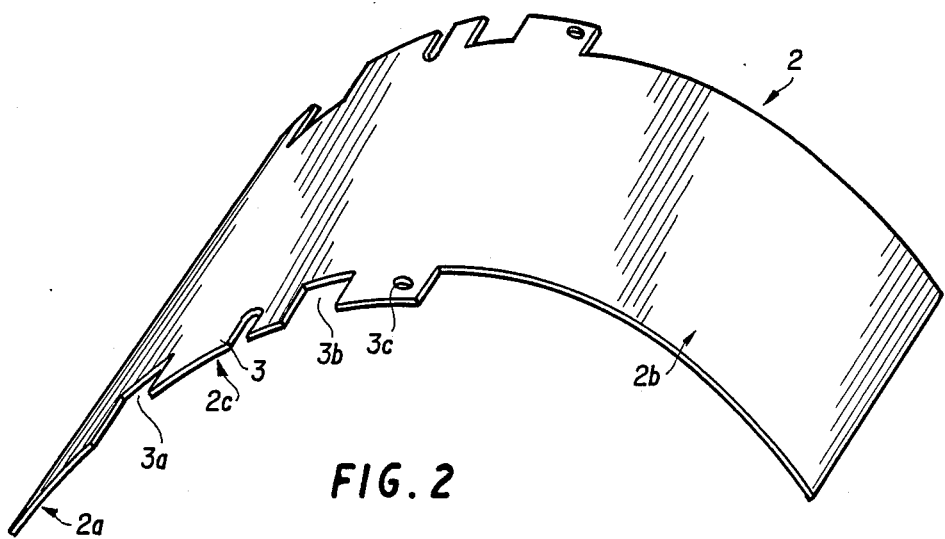
FIG. 2 shows a perspective view of one of the thin foils forming the cartridge of FIG. 1.

The independent cartridge 1, shown by way of example in FIG. 1, is made with several curved thin foils, namely eight foils in the example shown, each foil being of the type shown schematically in FIG. 2.

Thus each foil 2, made of thin plate metal, comprises, on its length, an end heel 2a, a slight flexure 2b followed by a portion 2c called an internal fixing portion and a functional part 2d which extends the internal fixing portion 2c. Each foil is cut out so that its end heel 2a and its internal fixing portion 2c are slightly wider than its functional part 2d, said heel and internal portion thus having lateral margins 3. These margins have notches such as 3a and 3b, designed to immobilize the cartridge 1 in the bearing body. In the example shown, two notches have been shown on each margin 3, so that, in an adapted position, the notch 3a of a foil is superimposed on the notch 3b of the top foil.

Furthermore, the margins 3 of each foil comprise positioning holes such as 3c used to manufacture the cartridge 1.

The various faces 2 of the cartridge are soldered to one another by soldering spots as shown in 4a and 4b in FIG. 1. Thus, each foil 2 is fixed, firstly, at 4a by its end heel 2a to the bottom foil and, secondly, at 4b by its internal fixing part 2c to the top foil. Preferably, the soldering spots are made at the two lateral margins 3 of the foils.

Thus, the above-described cartridge forms an independent unit wherein the foils have a precise position with respect to each other. When the foils are thus positioned, their external heel forms an external peripheral surface SE, the diameter of which is substantially equal to the diameter of the bore of the bearing body whereas their functional parts 2d form an internal floating surface SI with a diameter corresponding to that of the shaft and with a shape adapted to causing the hydrodynamic effect sought, namely the creation of buoyant corners in the zones C located at the boundary of two foils.

Figure 3:
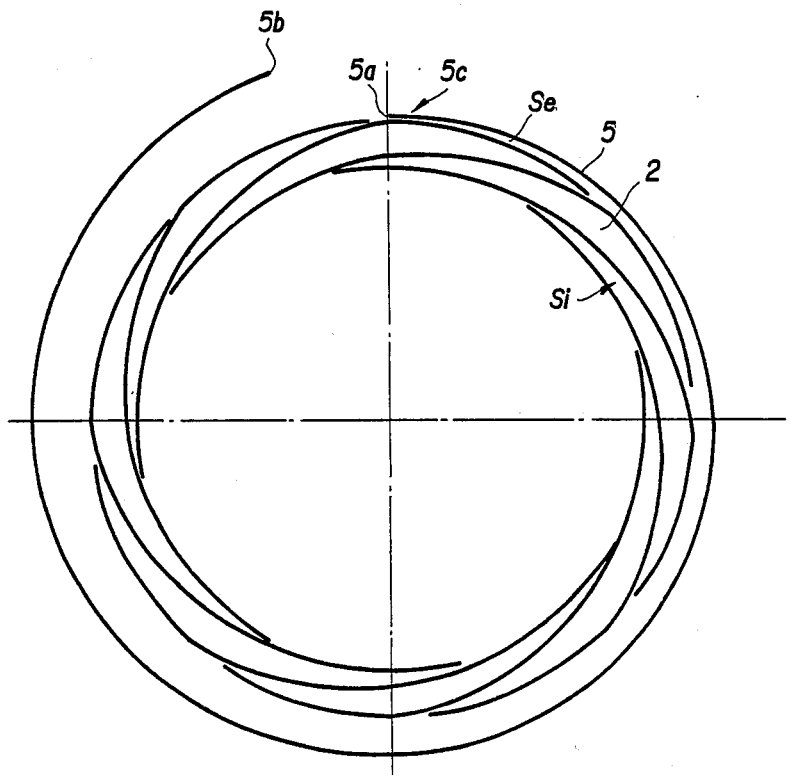
FIG. 3 shows a schematic cross-sectional view of an independent cartridge according to the present invention.

As shown in FIG. 3, according to the present invention, the external peripheral surface SE of the cartridge of FIG. 1 has been surrounded by a flexible foil 5, one end 5a of which is fixed to the external surface of the cartridge along a generatrix of the cartridge while the other end 5d is free. Preferably, the flexible foil is formed by a steel foil and has a rectangular shape. Furthermore, the flexible foil is fixed to the cartridge by soldering, preferably by two soldering spots 5c provided at each tip of the end 5a.

Figure 4:
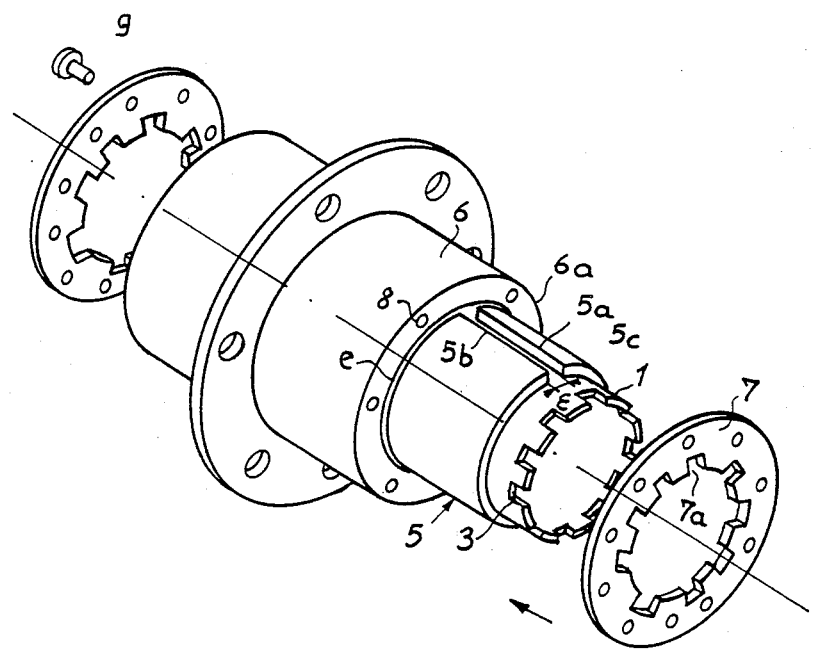
FIG. 4 shows a perspective view of a hydrodynamic bearing provided with an independent cartridge according to the present invention, and, FIGS. 5a and 5b give a schematic view, in an longitudinal axial section, of a hydrodynamic bearing conforming to the bearing described in the European patent EP-A-No. 095961 and to the bearing of the present invention.

Furthermore, as shown in FIG. 4, the length between the end 5a and the end 5b is smaller than the circumference of the cartridge 1, so that, once it is mounted, a clearance E is left between the two edges. Furthermore, the size of the flexible foil is smaller than the length of the cartridge 1, so that the margins 3, comprising the solderings of the foils with one another, are not surrounded.

Referring to FIG. 4, we shall now explain the method for assembling a hydrodynamic bearing using a cartridge as shown in FIG. 3. The bearing body 6, used in this case, has a smooth internal bore simply provided, on its two edges 6a, with tapped blind holes such as 8.

The cartridge designed to fit the body 6 is made in the dimensional plane so that the diameter of the unit formed by cartridge 1 proper and the flexible foil 5 is slightly greater than that of the bore of the body. To insert the cartridge formed by the cartridge proper and by the flexible foil in this bore, the bearing body 6 is placed in a chamber, preferably heated up to a temperature greater than 200° C. The bearing body is made of an alloy which expands at the heating temperature of the chamber, giving a clearance which enables the unit comprising the cartridge and the flexible foil to be inserted by axia thrust into the bore. This insertion is made until the set is positioned inside the body 5, with only the notched margins 3 extending beyond either of its sides.

When the set comprising the cartridge and flexible foil are held still by means of two ring-shaped washers such as 7, having an internal notch 7a adapted to the notch of the cartridge. The two notches get imbricated with each other and prevent any rotational movement of the cartridge inside the bore. Furthermore, screws such as 9 enable the weshers 7 to be fixed to the edges of the bearing body 6.

Figure 5A:
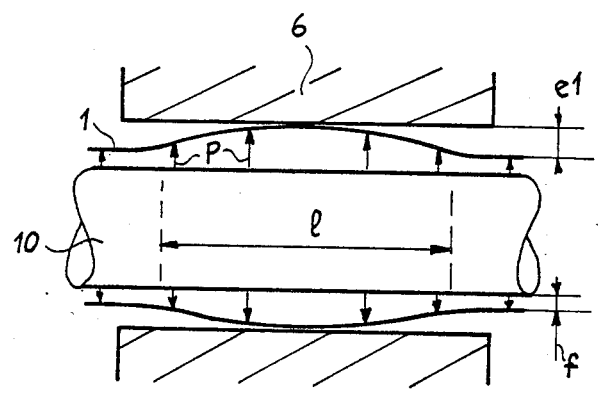
Figure 5B:
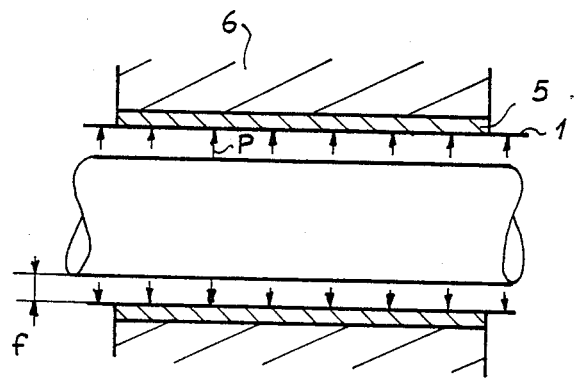

Then, the bearing body is allowed to cool down so that the clearance e disappears as shown in FIG. 5b which, with reference to FIG. 5a representing the prior art, gives a schematic view of the advantages of the present invention.

With the new set comprising the cartridge and the flexible foil, it is no longer necessary to have an assembling clearance el (see FIG. 5a). This assembling clearance el was necessary with the cartridge according to the patent EP-A-No. 095961, to take into account deformations at either end of the cartridge due to solderings to join the foils together as shown in FIG. 5a. This assembling clearance is added to the operational clearance f. During operation, this may give an excessive total clearance on the entire central part L of the bearing under the effect of pressure P. With the prior art cartridge, if the assembling clearance el were to be reduced to improve operation at the center, the assembling clearance would then become too small at the ends which, during operation, would then come into contact with the shaft 10. With the present invention, there is no longer any assembling clearance and the operating clearance is uniform throughout the length of the bearing.

Thus, the set forming the cartridge and the flexible foil according to the present invention makes it possible to avoid excessive off-centering during operation by increasing the stiffness of said set.

Furthermore, flows created within the cartridge provide heat energy due to compressibility and to the turbulence of air. Thus, a set of this kind enables the conservation, in all cases, of the clamping of the cartridge and the flexible foil in the bore

What is claimed is:

1. A hydrodynamic bearing to support and guide a rotating machine shaft, said bearing being of the type comprising, in the bore of a bearing body, an independent cartridge designed to form the internal functional unit of the bearing, said cartridge consisting of curved thin foils fixed to one another with overlapping parts, so as to form ar independent unit possessing, firstly, an internal floating surface, adapted to being placed around this shaft and adapted to setting up the conditions, during the rotation of the shaft, for the formation of a fluid film between the shaft and the internal surface and, secondly, a peripheral external surface with a diameter corresponding to that of the bore of the bearing body, said bearing further comprising means to hold the cartridge still in rotation and axial translation inside the bore, wherein the external surface of the cartridge is surrounded by a flexible foil fixed by one of its ends to an external generatrix of the cartridge while its other end is free.

2. A hydrodynamic bearing according to claim 1, wherein the flexible foil consists of a steel foil.

3. A hydrodynamic bearing according to claim 1, wherein the flexible foil is rectangular.

4. A hydrodynamic bearing according to claim 1, wherein the length between the end fixed on the generatrix and the free end is smaller than the circumference of the cartridge.

5. A hydrodynamic bearing according to claim 1 wherein the dimension of the end of the flexible foil fixed on the generatrix is smaller than the length of the generatrix.

6. A hydrodynamic bearing according to claim 1, wherein the flexible foil is fixed to the cartridge by soldering.

* * * * *